(12) United States Patent
Biffle et al.

(10) Patent No.: US 9,153,854 B1
(45) Date of Patent: Oct. 6, 2015

(54) INTEGRATION OF ANTENNA STRUCTURES INTO BALLOON ENVELOPES

(71) Applicant: Google Inc., Mountain View, CA (US)

(72) Inventors: Cliff L. Biffle, Mountain View, CA (US); Richard Wayne DeVaul, Mountain View, CA (US); Joshua Weaver, Mountain View, CA (US); Anton Valdemar Staaf, San Jose, CA (US); Eric Teller, Palo Alto, CA (US); Michael Cassidy, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 13/712,618

(22) Filed: Dec. 12, 2012

(51) Int. Cl.
  *B64B 1/40* (2006.01)
  *H01Q 1/12* (2006.01)
  *H04B 1/06* (2006.01)
  *H04B 1/38* (2015.01)

(52) U.S. Cl.
  CPC .............. *H01Q 1/1292* (2013.01); *H04B 1/06* (2013.01); *H04B 1/38* (2013.01)

(58) Field of Classification Search
  CPC ............ H01Q 1/243; H01Q 9/42; H01Q 1/38
  See application file for complete search history.

(56) References Cited

U.S. PATENT DOCUMENTS

| 7,046,934 | B2 | 5/2006 | Badesha et al. | |
| 7,341,223 | B2 * | 3/2008 | Chu | 244/24 |
| 8,152,093 | B2 | 4/2012 | Liggett et al. | |
| 8,812,176 | B1 * | 8/2014 | Biffle et al. | 701/2 |
| 8,820,678 | B2 * | 9/2014 | Devaul et al. | 244/96 |
| 8,825,847 | B1 * | 9/2014 | Teller et al. | 709/224 |
| 8,996,024 | B1 * | 3/2015 | Teller et al. | 455/452.1 |
| 2004/0065773 | A1 * | 4/2004 | Morales | 244/30 |
| 2005/0224639 | A1 * | 10/2005 | Kavanagh | 244/31 |
| 2011/0292348 | A1 * | 12/2011 | Tobita et al. | 353/28 |
| 2012/0112964 | A1 * | 5/2012 | Thill et al. | 343/700 MS |
| 2013/0175387 | A1 * | 7/2013 | DeVaul et al. | 244/31 |
| 2013/0175391 | A1 * | 7/2013 | DeVaul et al. | 244/96 |
| 2013/0177321 | A1 * | 7/2013 | DeVaul et al. | 398/115 |
| 2013/0177322 | A1 * | 7/2013 | DeVaul et al. | 398/131 |

(Continued)

FOREIGN PATENT DOCUMENTS

JP    2002-314479    10/2002

OTHER PUBLICATIONS

A. R. Burgers, "How to Design Optimal Metallization Patterns for Solar Cells", Progress in Photovoltaics, Jan. 18, 2000, pp. 457-461, vol. 7, Issue 6, John Wiley & Sons Ltd.

(Continued)

*Primary Examiner* — Bobbak Safairpour
(74) *Attorney, Agent, or Firm* — McDonnell Boehnen Hulbert & Berghoff LLP

(57) ABSTRACT

Methods and apparatus are disclosed for receiving and transmitting signals at a balloon. Received signals can be received at the balloon, which can include a payload and an envelope. The envelope can include at least a first antenna section and a second antenna section. Both the first and second antenna sections are configured at least to receive the received signals and convey at least the received signals to the payload. The first antenna section can include a first metallization pattern to receive a first type of signal. The second antenna section can include a second metallization pattern to receive a second type of signal, with the first metallization pattern being different from the second metallization pattern.

20 Claims, 8 Drawing Sheets

(56) References Cited

U.S. PATENT DOCUMENTS

| | | | |
|---|---|---|---|
| 2013/0179008 A1* | 7/2013 | DeVaul et al. | 701/3 |
| 2013/0238784 A1* | 9/2013 | Teller et al. | 709/224 |
| 2013/0303218 A1* | 11/2013 | Teller et al. | 455/507 |
| 2014/0014769 A1* | 1/2014 | DeVaul et al. | 244/97 |
| 2014/0014770 A1* | 1/2014 | Teller et al. | 244/97 |
| 2014/0015694 A1* | 1/2014 | Teller et al. | 340/946 |
| 2014/0048646 A1* | 2/2014 | DeVaul et al. | 244/97 |
| 2014/0085135 A1* | 3/2014 | Devaul et al. | 342/357.4 |
| 2014/0155093 A1* | 6/2014 | Teller | 455/456.3 |
| 2014/0171075 A1* | 6/2014 | Teller | 455/435.1 |
| 2014/0188377 A1* | 7/2014 | Bonawitz et al. | 701/120 |
| 2014/0319270 A1* | 10/2014 | DeVaul et al. | 244/96 |
| 2014/0319271 A1* | 10/2014 | DeVaul et al. | 244/97 |
| 2014/0333491 A1* | 11/2014 | Behroozi et al. | 343/706 |
| 2015/0061937 A1* | 3/2015 | Bonawitz et al. | 342/451 |
| 2015/0063159 A1* | 3/2015 | Bonawitz et al. | 370/254 |

OTHER PUBLICATIONS

Cisco Systems Inc.,"Antenna Patterns and their Meaning", 2007, Cisco Systems, Inc.

P.W. Gorham et al, "The ExaVolt Antenna: A Large-Aperture, Balloon-embedded Antenna for Ultra-High Energy Particle Detection", Instrumentation and Methods for Astrophysics, Aug. 9, 2011, arXiv:1102.3883v2.

WIKIPEDIA,"BoPET—Wikipedia, the Free Encyclopedia", Aug. 14, 2012, Wikimedia Foundation Inc.

* cited by examiner

~100

~110
Receiving a first signal at a balloon, where the balloon includes a first receiver, a second receiver, a payload, and an envelope, where the envelope includes at least a first antenna section and a second antenna section, where the first signal is received at the first antenna section, and where the first antenna section includes a first metallization pattern configured to receive and convey the first signal to the first receiver ~120
Receiving a second signal at the balloon, where the second signal is received at the second antenna section, where the second antenna section includes a second metallization pattern that is configured to receive and convey the second signal to the second receiver, the first metallization pattern being different from the second metallization pattern

FIGURE 1

INTEGRATION OF ANTENNA STRUCTURES INTO BALLOON ENVELOPES

BACKGROUND

Unless otherwise indicated herein, the materials described in this section are not prior art to the claims in this application and are not admitted to be prior art by inclusion in this section.

Current high-altitude balloons can include an envelope and a payload which are connected via wires. In some cases, the payload can include a communications receiver. The envelope can be made of a light-weight fabric, such as, but not limited to, nylon, silk, or polyester film, or combinations thereof, that can contain gases used to keep the balloon aloft. An example polyester film is Biaxially-oriented Polyethylene Terephthalate (boPET) a.k.a. Mylar™ Mylar™ is trademarked by E. I. DuPont De Nemours & Co. of Wilmington, Del.

Some communication receivers aboard current high-altitude balloons can require a clear upward view for communication. For example, a balloon's envelope can block communication signals, such as signals from satellites, from reaching a communication receiver.

SUMMARY

In a first aspect, a balloon is provided. The balloon includes a payload and an envelope. The envelope can include at least a first antenna section and a second antenna section. Both the first antenna section and the second antenna section are configured at least to receive signals and convey the received signals to the payload. The first antenna section includes a first metallization pattern to receive a first type of signal. The second antenna section includes a second metallization pattern to receive a second type of signal; the first metallization pattern being different from the second metallization pattern.

In another aspect, a method is provided. A first signal is received at a balloon. The balloon includes a first receiver, a second receiver, a payload, and an envelope. The envelope includes at least a first antenna section and a second antenna section. The first signal is received at the first antenna section of the plurality of antenna sections. The first antenna section includes a first metallization pattern configured to receive and convey the first signal to the first receiver. A second signal is received at the balloon. The second signal is received at the second antenna section. The second antenna section includes a second metallization pattern configured to receive and convey the second signal to the second receiver; the first metallization pattern being different from the second metallization pattern.

The foregoing summary is illustrative only and is not intended to be in any way limiting. In addition to the illustrative aspects, appearances, embodiments, and features described above, further aspects, appearances, embodiments, and features will become apparent by reference to the figures and the following detailed description.

BRIEF DESCRIPTION OF THE DRAWINGS

FIG. 1 is a flow chart of a method, according to an example embodiment.

DETAILED DESCRIPTION

Overview

Figure 2:
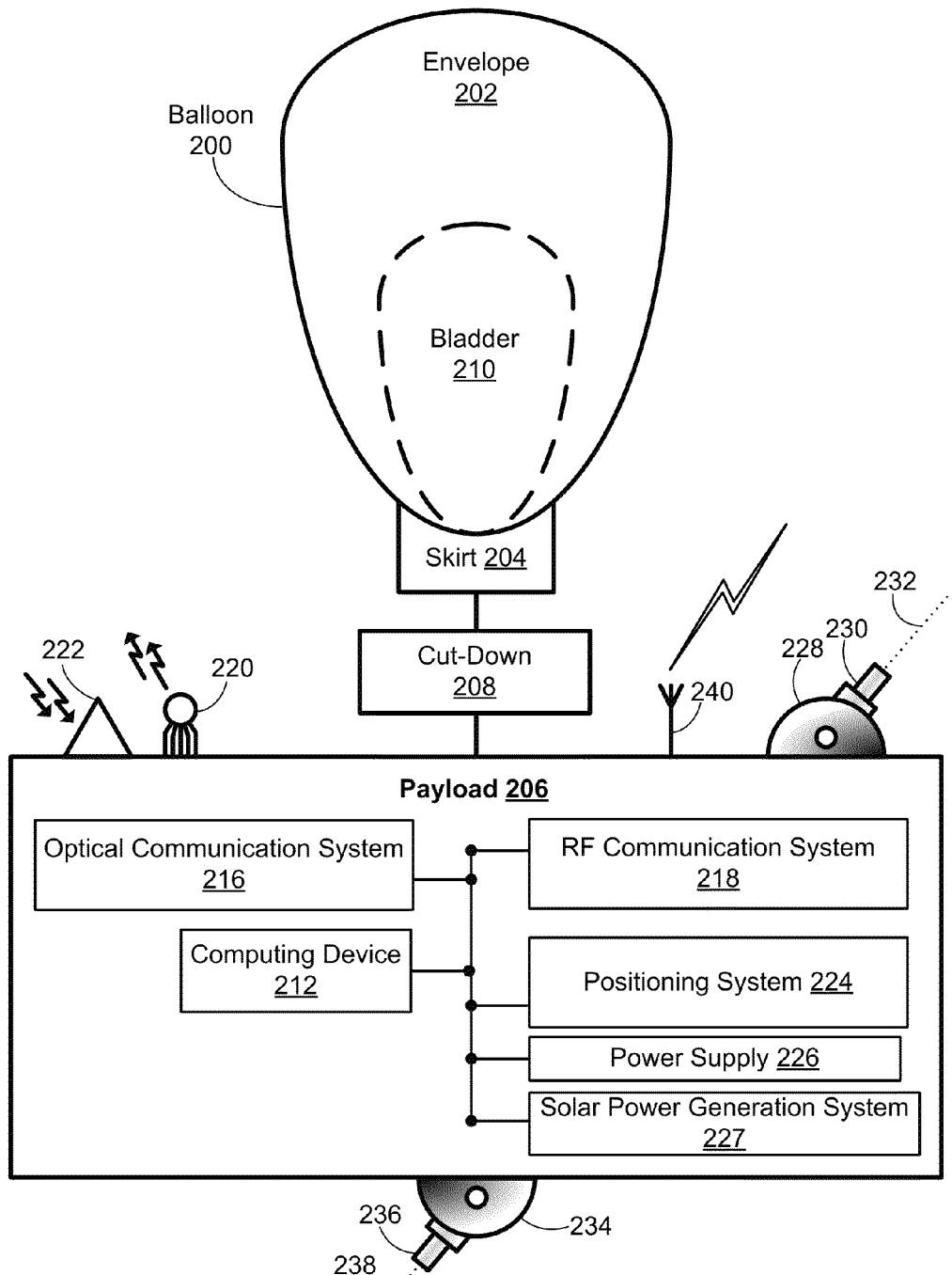
FIG. 2 shows an example balloon, in accordance with an example embodiment.

Example embodiments disclosed herein can generally relate to a data network formed by balloons, and in particular, to a mesh network formed by high-altitude balloons deployed in the stratosphere. In order that the balloons can provide a reliable mesh network in the stratosphere, where winds may affect the locations of the various balloons in an asymmetrical manner, the balloons in an exemplary network can be configured to move latitudinally and/or longitudinally relative to one another by adjusting their respective altitudes, so that winds aloft can carry the respective balloons to the respectively desired locations.

Further, in an exemplary balloon network, the balloons can communicate with one another using free-space optical communications. For instance, the balloons can be configured for optical communications using ultra-bright LEDs or possibly lasers for optical signaling (although regulations for laser communications can restrict laser usage). In addition, the balloons can communicate with ground-based station(s) using radio-frequency (RF) communications. Further, the balloons can be configured to communicate with one or more satellites. The one or more satellites can include but not limited to navigational satellites; e.g., Global Positioning System (GPS) satellites, communications satellites, broadcast television and/or radio satellites, and/or other satellites.

To better communicate with satellites and other overhead communication devices; e.g., communication devices aboard high-flying aircraft, a balloon can be configured with an envelope divided into sections. These sections can include one or more "antenna sections." Each antenna section of the envelope can be configured to send and/or receive signals, such as but not limited to signals from overhead communication source.

In some cases, the balloon can send communication signals. For example, the balloon can generate data, such as diagnostic data about the balloon or communications to other balloons in the network, that can be converted into communications signals for transmission. In other cases, the balloon can receive communications signals from other balloons in the network or signals that include navigational data from GPS or other navigational satellites. In yet other cases, the balloon can both send and receive communication signals. For example, the balloon can receive signals from one balloon in the network and relay the signals, perhaps after modification, to another balloon or communications device.

An example antenna section can be a "metallization section" with a thin layer of metallized material substantially or completely overlaying a fabric making up a section of the envelope. Communication signals can be received at the thin layer of metallized material and transmitted from the antenna section to a control system in the payload of the balloon. Antenna sections can include "metallization patterns" (MPs) or patterns of metal embedded into and/or overlaying the fabric of the section. Example metallization patterns include, but are not limited, horizontal, diagonal, and vertical patterns that can act as dipole antennas, two-dimensional patches and/or arrays of patches of thin metal shaped as squares, rectangles, triangle, circles, ellipses, and/or in other shapes that can act as patch and/or other types of antenna, and "Z metallization patterns" that are configured to project an antenna out of a plane of the envelope of the balloon.

By using antenna sections for balloons, the balloon can gain and/or enhance the ability to communicate with overhead communications sources, such as satellites, other balloons in the network, and overhead aircraft. In some scenarios, overhead communications sources may not be directly overhead, and so antenna sections can receive communication signals from communication sources in other directions relative to the balloon, such as communication source(s) with higher, equal, and/or lower altitude(s) than the balloon. Such communications sources can include balloons, ground stations, mobile communications and/or computing devices, and other communications devices. By enhancing the ability of the balloon to communicate, the balloon can be able to increase performance via better navigation; i.e., using GPS, carrying out additional communications, and providing additional services; e.g., balloon/satellite communication.

As the envelope of the balloon is often a large object, the use of antenna sections that are part of balloon envelopes enables putting large antennas aloft whenever the balloon is launched. As putting large separate antennas aloft can be complicated and expensive, using antenna sections of balloon envelopes can save time and difficulty in comparison.

The use of multiple antenna sections can lead to increased communication throughput by enabling multiple simultaneous communications sessions, perhaps with each session using a different antenna section. Also, the multiple simultaneous communications sessions can involve simultaneous communications between the balloon and multiple communications devices, such as multiple satellites, balloons, ground stations, and/or other communication devices. In some scenarios, different types of signals can be received and/or transmitted using the multiple antenna sections; e.g. the balloon can receive a GPS signal from a GPS satellite and a balloon-RF signal from another balloon or the balloon can communicate with a ground station using RF signals that can have different protocol, frequency, encoding, and/or other characteristics than balloon-RF signals and/or GPS signals.

Example Operations

FIG. 1 is a flow chart of method 100, according to an example embodiment. Method 100 begins at block 110, where a first signal is received at a balloon. The balloon can include a first receiver, a second receiver, a payload, and an envelope. At least a portion of the envelope can include at least a first antenna section and a second antenna section. The first signal can be received at the first antenna section. The first antenna section can include a first metallization pattern configured to receive and convey the first signal to the first receiver.

At block 120, a second signal is received at the balloon. The second signal can be received at the second antenna section. The second antenna section can include a second metallization pattern configured to receive and convey the second signal to the second receiver. The first metallization pattern can differ from the second metallization pattern.

In some embodiments, the balloon can initially operate in a first mode in which the balloon operates the first receiver to receive the first signal and does not operate the second receiver. In these embodiments, method 100 can further include: while the balloon is operating in the first mode, a trigger event can be detected; and in response to detecting the trigger event, the balloon can switch from operation in the first mode to operation in a second mode in which the balloon operates the second receiver to receive the second signal and does not operate the first receiver.

In other embodiments, method 100 can further include: in response to receiving the first signal, determining a transmittable signal; and transmitting the transmittable signal from the balloon using a transmitting antenna section of the plurality of antenna sections. The transmitting antenna section can include either the first antenna section or the second antenna section. In particular embodiments, determining the transmittable signals can include determining diagnostic information about the balloon. Then, the transmittable signals can be generated based on the diagnostic information. In other particular embodiments, the transmittable signals are based on the first signal. In still other particular embodiments, the balloon can also include a control system. Then, transmitting the transmittable signal can include: selecting the transmitting antenna section using the control system and transmitting the transmittable signals using the transmitting antenna section.

Example Balloons and Balloon Segments

Various types of balloon systems can be incorporated in an example balloon network. Some embodiments can utilize high-altitude balloons that may operate in an altitude range between 18 km and 22 km. FIG. 2 shows a high-altitude balloon 200, according to an example embodiment. As shown, balloon 200 includes envelope 202, skirt 204, payload 206, and cut-down system 208 attached between balloon 202 and payload 206.

The envelope 202 and skirt 204 can take various forms, which can be currently well-known or yet to be developed. For instance, envelope 202 and/or skirt 204 can be made of metalized Mylar™ or boPET. Alternatively or additionally, some or all of envelope 202 and/or skirt 204 can be constructed from a highly-flexible latex material or a rubber material such as chloroprene. Other materials are also possible at least as discussed herein. Further, the shape and size of envelope 202 and skirt 204 can vary depending upon the particular implementation. Additionally, envelope 202 can be filled with various different types of gases, such as helium and/or hydrogen. Other types of gases are possible as well.

The payload 206 of balloon 200 can include a computing device 212. In particular, computing device 212 can be configured to store instructions that can be accessed and executed by computing device 212 in order to carry out some or all the balloon functions described herein. Computing devices are described in more detail below in the context of FIGS. 7A and 7B.

Payload 206 of balloon 200 can also include various other types of equipment and systems to provide a number of different functions. For example, payload 206 can include optical communication system 216, which can transmit optical signals via an ultra-bright LED system 220, and which can receive optical signals via an optical-communication receiver; e.g., a photo-diode receiver system. Further, payload 206 can include RF communication system 218, which can transmit and/or receive RF communications via an antenna system 240.

Payload 206 can also include power supply 226 configured to supply power to the various components of balloon 200.

Power supply 226 can include or take the form of a rechargeable battery. In other embodiments, power supply 226 can additionally or alternatively represent other means known in the art for producing power. In addition, balloon 200 can include solar power generation system 227. Solar power generation system 227 can include solar panels and could be used to generate power that charges and/or is distributed by the power supply 226.

Further, payload 206 can include various types of other systems and sensors 228, 234. For example, payload 206 can include one or more video and/or still cameras, a GPS system, various motion sensors (e.g., accelerometers, gyroscopes, and/or compasses), and/or various sensors for capturing environmental data. Further, some or all of the components within payload 206 can be implemented in a radiosonde, which can be operable to measure, e.g., pressure, altitude, geographical position (latitude and longitude), temperature, relative humidity, and/or wind speed and/or direction, among other information.

As noted, balloon 206 includes an ultra-bright LED system 220 for free-space optical communication with other balloons. As such, optical communication system 216 can be configured to transmit a free-space optical signal by modulating the ultra-bright LED system 220. The optical communication system 216 can be implemented with mechanical systems and/or with hardware, firmware, and/or software. Generally, the manner in which an optical communication system is implemented can vary, depending upon the particular application.

In a further aspect, balloon 200 can be configured for altitude control. For instance, balloon 200 can include a variable buoyancy system, which is configured to change the altitude of balloon 200 by adjusting the volume and/or density of the gas in balloon 200. A variable buoyancy system can take various forms, and can generally be any system that can change the volume and/or density of gas in envelope 202.

In an exemplary embodiment, a variable buoyancy system can include a bladder 210 located inside of envelope 202. Bladder 210 could be an elastic chamber configured to hold liquid and/or gas. Alternatively, bladder 210 need not be inside envelope 202. For instance, bladder 210 can be a rigid bladder perhaps pressurized well beyond neutral pressure. The buoyancy of balloon 200 can therefore be adjusted by changing the density and/or volume of the gas in bladder 210. To change the density of bladder 210, balloon 200 can be configured with systems and/or mechanisms for heating and/or cooling the gas in bladder 210. Further, to change the volume, balloon 200 can include pumps or other features for adding gas to and/or removing gas from bladder 210. Additionally or alternatively, to change the volume of bladder 210, balloon 200 can include release valves or other features that are controllable to allow gas to escape from bladder 210. Multiple bladders 210 could be implemented within the scope of this disclosure. For instance, multiple bladders 210 could be used to improve balloon stability.

In an example embodiment, envelope 202 could be filled with helium, hydrogen or other lighter-than-air material. Envelope 202 could thus have an associated upward buoyancy force. In such an embodiment, air in the bladder 210 could be considered a ballast tank that can have an associated downward ballast force. In another example embodiment, the amount of air in bladder 210 could be changed by pumping air, perhaps using an air compressor, into and out of bladder 210. By adjusting the amount of air in bladder 210, the ballast force can be controlled. In some embodiments, the ballast force can be used, in part, to counteract the buoyancy force and/or to provide altitude stability.

In other embodiments, envelope 202 could be substantially rigid and include an enclosed volume. Air could be evacuated from envelope 202 while the enclosed volume is substantially maintained. In other words, at least a partial vacuum could be created and maintained within the enclosed volume. Thus, envelope 202 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

Further, balloon 200 can include a navigation system (not shown). The navigation system can implement station-keeping functions to maintain position within and/or move to a position in accordance with a desired topology. In particular, the navigation system can use altitudinal wind data to determine altitudinal adjustments that result in the wind carrying the balloon in a desired direction and/or to a desired location. The altitude-control system can then make adjustments the density of the balloon chamber in order to effectuate the determined altitudinal adjustments and cause the balloon to move laterally to the desired direction and/or to the desired location.

Alternatively, the altitudinal adjustments can be computed by a ground-based control system and communicated to balloon 200. As another alternative, the altitudinal adjustments can be computed by a ground-based or satellite-based control system and communicated to balloon 200. Furthermore, in some embodiments, specific balloons in a heterogeneous balloon network can be configured to compute altitudinal adjustments for other balloons and transmit the adjustment commands to those other balloons.

As shown, balloon 200 includes cut-down system 208. The cut-down system 208 can be activated to separate the payload 206 from the rest of balloon 200. This functionality can be utilized anytime the payload needs to be accessed on the ground, such as when it is time to remove balloon 200 from a balloon network, when maintenance is due on systems within payload 206, and/or when power supply 226 needs to be recharged or replaced.

In an exemplary embodiment, the cut-down system 208 can include a connector, such as a balloon cord, connecting the payload 206 to the envelope 202 and a means for severing the connector (e.g., a shearing mechanism or an explosive bolt). In an example embodiment, the balloon cord, which can be nylon, is wrapped with a nichrome wire. A current could be passed through the nichrome wire to heat it and melt the cord, cutting the payload 206 away from the envelope 202. Other types of cut-down systems and/or variations on the illustrated cut-down system 208 are possible as well.

In an alternative arrangement, a balloon may not include a cut-down system. In such an arrangement, the navigation system can be operable to navigate the balloon to a landing location, in the event the balloon needs to be removed from the network and/or accessed on the ground. Further, it is possible that a balloon can be self-sustaining, such that it theoretically does not need to be accessed on the ground. In yet other embodiments, balloons can be serviced in-flight by specific service balloons or another type of service aerostat or service aircraft.

Figure 3:
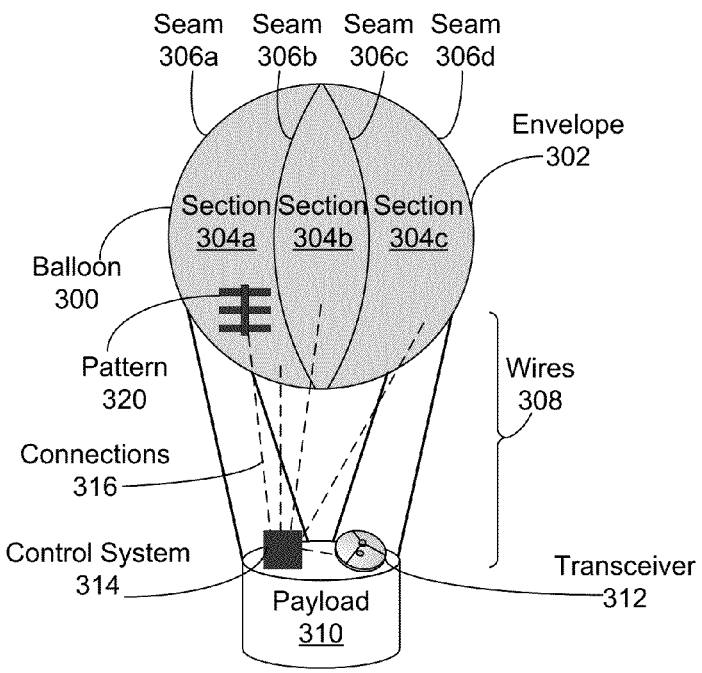
FIG. 3 shows another example balloon, in accordance with an example embodiment.

FIG. 3 shows a balloon 300 with a balloon envelope 302 having integrated antennas in sections 304a, 304b, 304c connected via wires 308 to payload 310. Balloon 300 can be the same as or differ from balloon 200 described above in the context of FIG. 2 and/or balloon 500 described below in the context of FIG. 5A. In embodiments not shown in the Figures, balloon 300 can include some or all of the components of balloons 200 and 500 described that are not shown as components of balloon 300 in FIG. 3. In specific embodiments not shown in the Figures, wires 308 can be replaced with and/or complemented by a skirt and/or cut-down, such as skirt 204 and cut-down 208 of balloon 200 discussed above in the context of FIG. 2.

Envelope 302 is divided into antenna sections 304a, 304b, 304c that are separated by seams 306a, 306b, 306c, 306d. Payload 310 includes transceiver 312 configured to communicate with at least one or more satellites (not shown in FIG. 3) and control system 314. Control system 314 can be included as part of payload 310 as shown in FIG. 3 or, in other embodiments, placed elsewhere on balloon 300. FIG. 3 shows communication pathways as connections 316 as dashed lines from control system 314 to transceiver 312, sections 304a, 304b, 304c, and metallization pattern 320.

Antenna sections 304a, 304b, 304c can be partially or completely covered one or more metallized materials. If the antenna section is nearly or completely covered by a metallized material, the antenna section can also be termed as a "metallized section." The metallized material can be, but is not limited to copper, silver, or aluminum, and can overlay part or all of a fabric making up the corresponding section of envelope 302. In some embodiments, the metallized material need not be metallic in nature, but rather is any material suitable for conducting electrical, magnetic, and/or electromagnetic signals. Similarly, metallization patterns can utilize any material suitable for conducting electrical, magnetic, and/or electromagnetic signals.

Each antenna section 304a, 304b, 304c can be electrically isolated from one another by seams 306a, 306b, 306c, 306d. Seams 306a, 306b, 306c, 306d of envelope 302 can be made of an electrically isolating material such as boPET.

For signal reception, communication signals can be received at the thin layer of metallized material at an antenna section from one or more entities external to balloon 300 and transmitted from the antenna section to control system 314 via connection(s) 316. For signal transmission, communication signals can be generated at control system 314 and sent via connection(s) 316 to the thin layer of metallized material to be transmitted from the antenna section to one or more entities external to balloon 300.

For example, GPS signals can be received at antenna section 304a from a GPS satellite and transmitted via connections 316 to control system 314. Then, control system 314 can, if necessary, communicate the received GPS signals to a GPS receiver (not shown) in balloon 300; e.g., in payload 310. For signal transmission from balloon 300 to another entity outside balloon 300, communication signals destined for the other entity can be provided to and/or generated by control system 314 and communicated by connections 316 to an antenna section, such as section 304b. Then, antenna section 304b can send the communication signals as radio waves, which can be received by the other entity.

In some embodiments, two or more metallized sections can work together to act as one antenna. In other embodiments, each antenna section 304a, 304b, 304c can act as a separate antenna. For example, each antenna section can be designed with one or more material(s) and/or metallization pattern(s), such as metallization pattern 320 in section 304a of FIG. 3, so that it operates as a different kind of antenna. A metallized pattern can be on an outer surface of the envelope and/or could be partially or wholly embedded within the envelope.

Control system 314 can be configured to switch between antenna sections 304a, 304b, 304c, and/or metallization pattern 320 to send and/or receive signals. Once received, signals can be provided by control system 314 to transceiver 312 and/or other components carried by balloon 300; e.g., as part of payload 310, that are connected to the control system 314 enabling multiple frequencies and/or types of signals to be received at and utilized by balloon 300.

Similarly, transceiver 312 and/or other components of balloon 300, perhaps in payload 310, can be configured to send signals to control system 314. Signals provided to control system 314 can be conveyed to one or more antenna sections 304a, 304b, 304c, and/or metallization pattern 310 for transmission. In this fashion, multiple frequencies and/or types of signals can be sent by balloon 300.

Figure 4:
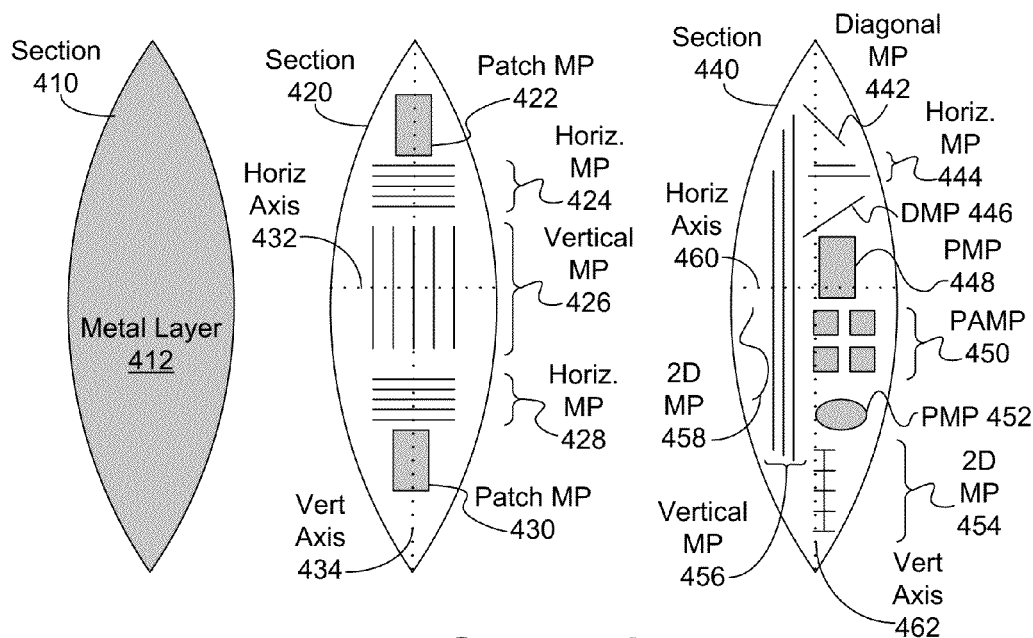
FIG. 4 shows example sections of a balloon, in accordance with an example embodiment.

FIG. 4 shows example sections 410, 420, and 440 of a balloon envelope, in accordance with an example embodiment. Section 410 is a balloon envelope section completely covered by metal layer 412 to act as an antenna section. In some embodiments, metal layer 412 can overlay a fabric layer of section 410. The fabric layer (not shown in FIG. 4) can be made of an airtight lightweight material, such as but not limited to, nylon, silk, or polyester (e.g., boPET), or combinations thereof. In other embodiments, metal layer 412 can be covered by the fabric layer. In still other embodiments, section 410 can be made solely of metal layer 412. In even other embodiments, multiple metal and/or fabric layers can be used to construct section 410.

Section 420 includes a symmetric series of metallization patterns; including patch metallization patterns (MPs) 422 and 430, horizontal metallization patterns 424 and 428, and vertical metallization pattern 426. The symmetric series of metallization patterns is symmetric both about horizontal axis 432 and vertical axis 434 of section 420. In some embodiments not shown, a series of metallization patterns can be symmetric about one axis of an antenna section and be asymmetric about another axis of the antenna section. Both axes 432, 434 of section 420 are shown in FIG. 4 as dotted lines, while components of the symmetric series of metallization patterns of section 420 are shown using solid lines. Each type of metallization pattern—patch, horizontal, vertical, etc.—in section 420 can be used to send/receive the same or different signals than other metallization patterns.

Section 440 includes an asymmetric series of metallization patterns, including diagonal MPs (DMPs) 442 and 446, horizontal metallization pattern 444, patch metallization patterns 448, 452, patch array metallization pattern (PAMP) 450, two-dimensional (2D) metallization patterns 454, 458, and vertical metallization pattern 456. The series of metallization patterns for section 440 is classified as asymmetric as the series of metallization patterns for section 440 does not show symmetry about either horizontal axis 460 or vertical axis 462. Both horizontal axis 460 and vertical axis 462 of section 440 are shown in FIG. 4 as dotted lines, while components of the symmetric series of metallization patterns of section 440 are shown using solid lines. Each type of metallization pattern—patch, horizontal, vertical, etc.—in section 440 can be used to send/receive the same or different signals than other metallization patterns.

In some embodiments, some or all of metallization patterns 320, 422-430, and 442-456 can be covered by fabric layer(s) and/or other layer(s) of respective sections 304a, 420, or 440, while in still other embodiments, some or all of metallization patterns 320, 422-430, and 442-456 can be uncovered by fabric layer(s) and/or other layer(s) respective sections 304a, 420, or 440. In even other embodiments, metallization patterns can be constructed as non-metallic "negative patterns" of a metal layer. A negative pattern can be a pattern of non-metallic material embedded in or overlaying the metal layer, a pattern of metal removed from the metal layer leaving a pattern-shaped gap in the metal layer, or a pattern of non-metallic material inside of, formed in, and/or otherwise part of the metal layer.

Figure 5A:
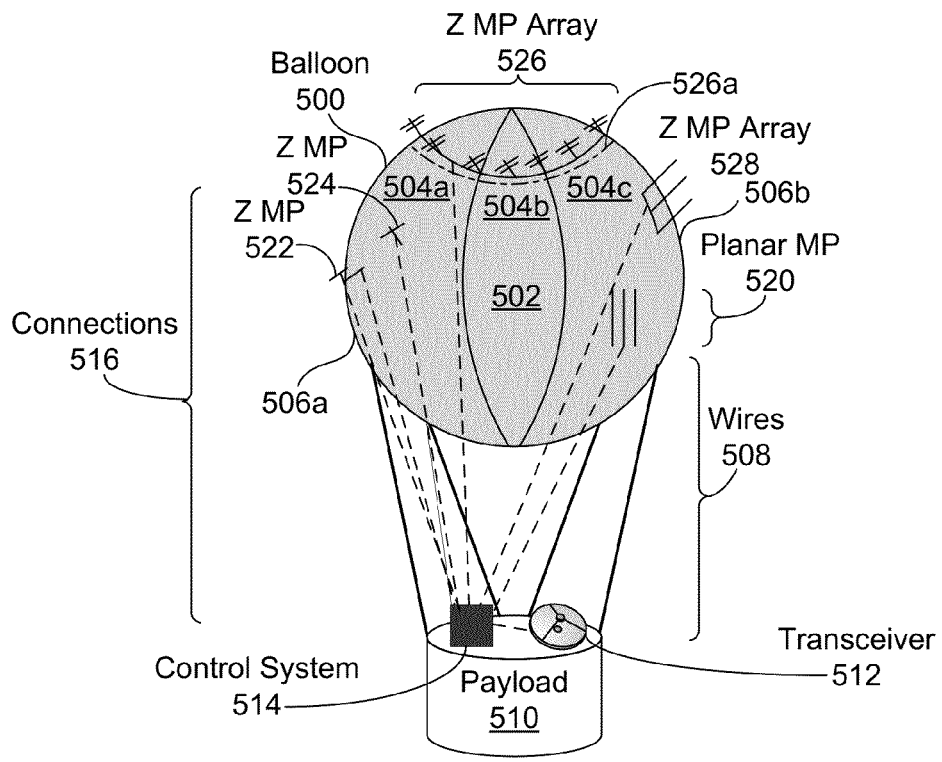
FIG. 5A shows another example balloon, in accordance with an example embodiment.

FIG. 5A shows balloon 500, in accordance with an example embodiment. Balloon 500 can be the same as or differ from balloon 200 described above in the context of FIG. 2 and/or balloon 300 described above in the context of FIG. 3. In embodiments not shown in the Figures, balloon 500 can include some or all of the components of balloons 200 and 300 that are not shown as components of balloon 500 in FIG. 5. In specific embodiments not shown in the Figures, wires 508 can be replaced with and/or complemented by a skirt and/or cut-down, such as skirt 204 and cut-down 208 of balloon 200 discussed above in the context of FIG. 2.

Balloon 500 includes envelope 502 made of antenna sections 504a, 504b, 504c separated by seams such as seams 506a and 506b. Envelope 502 is connected to payload 510 via wires 508. FIG. 5 shows payload 510 with transceiver 512 and control system 514. Transceiver 512 and control system 514 can perform the respective above-mentioned functions of transceiver 312 and control system 314 mentioned above in the context of FIG. 3. For example, control system 514 is configured to communicate signals to metallization patterns 520, 522, 524, 526, and 528 of balloon 500 via connections 516.

As with balloon 300, balloon 500 has metallization patterns in antenna sections 504a, 504b, 504c including planar metallization pattern 520 that is in the plane of section 504c. Balloon 500 also includes Z metallization patterns 522, 524, 526, and 528 that, at least in part, project out of the planes of sections 504a, 504b, and 504c. Z metallization pattern 522 includes two single pole antennas projecting out from the plane of section 504a. In some embodiments, the two antennas in pattern 522 can be electrically connected; e.g., by a metal layer of section 504a or by a conductor lying in the plane of section 504a connecting the two antennas. In other embodiments, the two antennas can be electrically isolated; e.g., the two antennas can be separated by a non-conducting layer of section 504a such as a non-metallic fabric layer.

Z metallization pattern 524 includes a single T shaped antenna projecting out from the plane of section 504a. Z metallization pattern 526 is shown in FIG. 5A as a Z metallization pattern array 526 made up of seven double-crossed antennas extending out of the plane of envelope 502 connected via a conductor traveling in an arc from section 504a to section 504c. In some embodiments, Z metallization pattern 526 can be contained in a single section, such as circular section covering the top of balloon separated by a seam 526a shown in FIG. 5A with a dotted and dashed line. Z metallization pattern array 528 is shown as three single pole antennas connected via a conductor in the plane of section 504c.

Figure 5B:
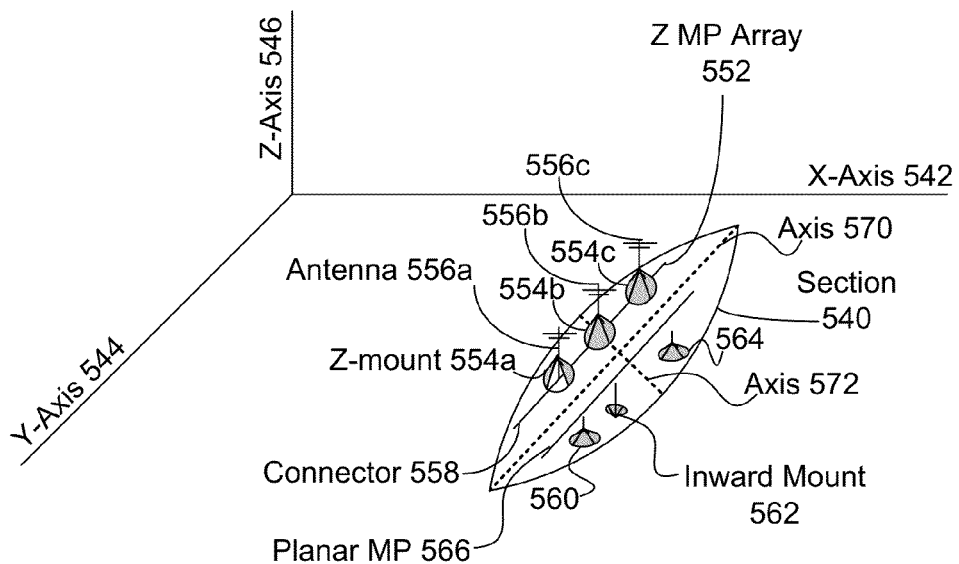
FIG. 5B shows an example section of a balloon, in accordance with an example embodiment.

FIG. 5B shows example section 540 of a balloon envelope, in accordance with an example embodiment. Section 540 is depicted in FIG. 5B in an x-y plane outlined by X-axis 542 and Y-axis 544, with Z-axis 546 as a vertical axis projecting from the x-y plane. Section 540 is shown with specific axes 570 and 572.

Section 540 includes Z metallization array 552 made up of three antennas 556a, 556b, and 556b mounted in respective "Z-mounts" 554a, 554b, 554c and connected via connector 558. Z-mounts 554a, 554b, 554c and antennas 556a, 556b, 556c project from the x-y plane in the direction of Z-axis 546, while connector 558 lies in a plane of section 540; e.g., in the x-y-plane.

Z-mount 554a is shown in a cutaway fashion to permit view of a bottom portion of antenna 556a in contact with connector 558. Similar connections can be used to connect antennas 556b and 556c to connector 558 as well. In other embodiments not shown in FIG. 5B, other connecting techniques can be used to connect antennas 556a, 556b, 556c via connector 558; e.g., Z-mount 554a can include conducive elements that electrically connect both connector 558 and antenna 556a to Z-mount 554a. In these other embodiments, antennas 556a, 556b, 556c may not be directly connected to connector 558; rather, antennas 556a, 556b, 556c could be indirectly connected to connector 558 via respective Z-mounts 554a, 554b, 554c.

FIG. 5B shows section 540 configured planar metallization pattern 566 in the plane of section 540 and two single antennas 560 and 564 projecting in the direction of Z-axis 546. Antennas 560 and 564 are configured using Z-mounts the same as or similar to Z-mounts 554a, 554b, 554c. Section 540 is also configured with an antenna projecting in the direction of Z-axis 546 using inward mount 562. Inward mount 562 can include a cavity or hole in one or more layers of section 540 configured to support an antenna inserted into the cavity or hole. In other embodiments, inward mount 562 can be configured as "volcano-shaped mount" that protrudes from section 540 in the direction of Z-axis 546 with a (nearly) central cavity that is configured to support an antenna protruding from the x-y plane. Other Z-mounts are possible as well.

Example Balloon Networks

Figure 6A:
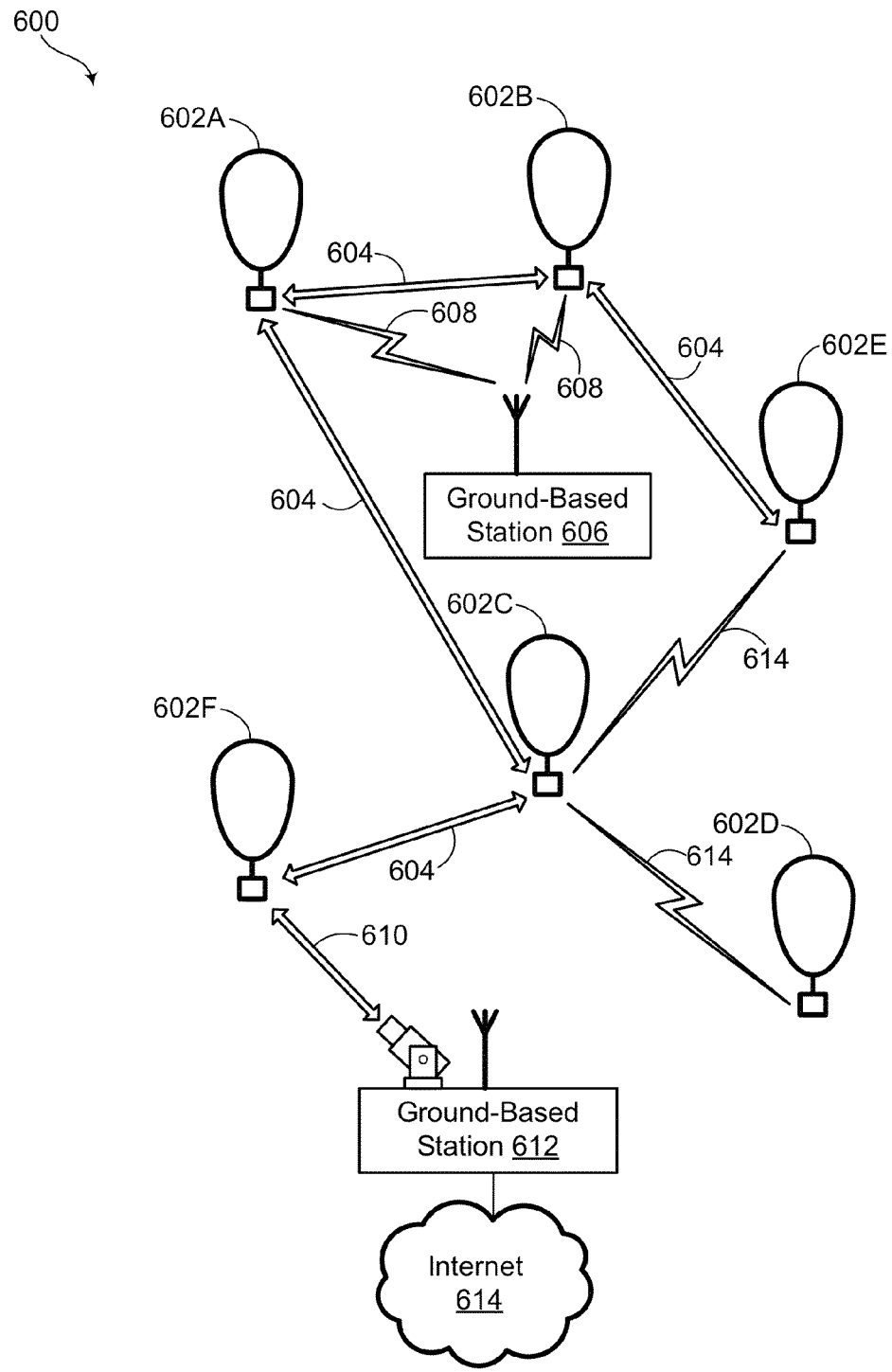
FIG. 6A shows an example network, in accordance with an example embodiment.

FIG. 6A shows balloon network 600, according to an example embodiment. As shown, balloon network 600 includes balloons 602A to 602F, which are configured to communicate with one another via free-space optical links 604. Each of balloons 602A to 602F can be configured with some or all of the components of balloons 200, 300, and/or 500 discussed above regarding FIGS. 2, 3, and 5. Configured as such, balloons 602A to 602F can collectively function as a mesh network for packet-data communications. Further, at least some of balloons 602A and 602B can be configured for RF communications with ground-based station 606 via respective RF links 608. Yet further, some balloons, such as balloon 602F, can be configured to communicate via optical link 610 with ground-based station 612.

In an exemplary embodiment, balloons 602A to 602F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons can be generally configured to operate in an altitude range within the stratosphere that has relatively low wind-speeds (e.g., between 5 and 20 miles per hour (mph)).

More specifically, in a high-altitude-balloon network, balloons 602A to 602F can generally be configured to operate at altitudes between 18 km and 25 km (although other altitudes are possible). This altitude range can be advantageous for several reasons. In particular, this layer of the stratosphere generally has relatively low wind speeds (e.g., winds between 5 and 20 mph) and relatively little turbulence. Further, while the winds between 18 km and 25 km can vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 602A to 602F can be configured to transmit an optical signal via optical link 604, 610. In an exemplary embodiment, a given balloon 602A to 602F can use one or more high-power light-emitting diodes (LEDs) to transmit an optical signal. Alternatively, some or all of balloons 602A to 602F can include laser systems for free-space optical communications over optical links 604, 610. Other types of free-space optical communication are possible. Further, in order to receive an optical signal from another balloon via optical link 604, 610, a given balloon 602A to 602F can include one or more optical receivers. Additional details of example balloons are discussed in greater detail above, with reference to FIGS. 2, 3, and 5.

In a further aspect, balloons 602A to 602F can utilize one or more of various different RF air-interface protocols for communication with ground-based station 606 via respective RF links 608. For instance, some or all of balloons 602A to 602F can be configured to communicate with ground-based stations 606 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there can be scenarios where RF links 608 do not provide a desired link capacity for balloon-ground communications. For instance, increased capacity can be desirable to provide backhaul links from a ground-based gateway and in other scenarios as well. Accordingly, an exemplary network can also include downlink balloons, which provide a high-capacity air-ground link.

For example, in balloon network 600, balloon 602F is configured as a downlink balloon. Like other balloons in an exemplary network, downlink balloon 602F can be operable for optical communication with other balloons via optical links 604. However, downlink balloon 602F can also be configured for free-space optical communication with ground-based station 612 via optical link 610. Optical link 610 can therefore serve as a high-capacity link (as compared to an RF link, such as link 608) between balloon network 600 and ground-based station 612.

Note that in some implementations, downlink balloon 602F can additionally be operable for RF communication with ground-based station 606. In other cases, downlink balloon 602F can only use an optical link for balloon-to-ground communications. Further, while the arrangement shown in FIG. 6A includes just one downlink balloon 602F, example balloon networks can also include multiple downlink balloons. On the other hand, a balloon network can also be implemented without any downlink balloons.

In other implementations, a downlink balloon can be equipped with a specialized, high-bandwidth RF communication system for balloon-to-ground communications, instead of, or in addition to, a free-space optical communication system. The high-bandwidth RF communication system can take the form of an ultra-wideband system, which can provide an RF link with substantially the same capacity as optical links 604, 610. Other forms are also possible.

Ground-based stations, such as ground-based stations 606 and/or 612, can take various forms. Generally, a ground-based station can include components such as transceivers, transmitters, and/or receivers for communication via RF links and/or optical links with a balloon network. Further, ground-based station 606 can use various air-interface protocols in order to communicate with a balloon 602A to 602F over RF links 608. As such, ground-based station 606 can be configured as an access point via which various devices can connect to balloon network 600. Ground-based station 606 can have other configurations and/or serve other purposes without departing from the scope of this disclosure.

In a further aspect, some or all of balloons 602A to 602F can be configured to establish a communication link with space-based satellites in addition to, or as an alternative to, a ground-based communication link. In some embodiments, a balloon can communicate with a satellite via an optical link. However, other types of satellite communications are also possible. See FIG. 6C discussed below for an example scenario regarding balloon/satellite communication.

Further, some ground-based stations, such as ground-based station 612, can be configured as gateways between balloon network 600 and one or more other networks, such as Internet 614. Thus, ground-based station 612 can serve as an interface between the balloon network 600 and Internet 614, a cellular service provider's network, and/or other types of networks. Variations on this configuration and other configurations of ground-based station 614 are also possible.

As noted, balloons 602A to 602F can collectively function as a mesh network. More specifically, since balloons 602A to 602F can communicate with one another using free-space optical links, the balloons can collectively function as a free-space optical mesh network.

In a mesh-network configuration, each balloon 602A to 602F can function as a node of the mesh network, which is operable to receive data directed to it and to route data to other balloons. As such, data can be routed from a source balloon to a destination balloon by determining an appropriate sequence of optical links between the source balloon and the destination balloon. These optical links can be collectively referred to as a "lightpath" for the connection between the source and destination balloons. Further, each of the optical links can be referred to as a "hop" on the lightpath.

To operate as a mesh network, balloons 602A to 602F can employ various routing techniques and self-healing algorithms. In some embodiments, balloon network 600 can employ adaptive or dynamic routing, where a lightpath between a source and destination balloon is determined and set-up when the connection is needed, and released at a later time. Further, when adaptive routing is used, the lightpath can be determined dynamically depending upon the current state, past state, and/or predicted state of the balloon network.

In addition, the network topology can change as the balloons 602A to 602F move relative to one another and/or relative to the ground. Accordingly, balloon network 600 can apply a mesh protocol to update the state of the network as the topology of the network changes. For example, to address the mobility of balloons 602A to 602F, balloon network 600 can employ and/or adapt various techniques that are employed in mobile ad hoc networks (MANETs). Other examples are possible as well.

In some implementations, balloon network 600 can be configured as a transparent mesh network. More specifically, in a transparent balloon network, the balloons can include components for physical switching that is entirely optical, without any electrical components involved in the physical routing of optical signals. Thus, in a transparent configuration with optical switching, signals travel through an entirely optical multi-hop lightpath.

In other implementations, the balloon network 600 can implement a free-space optical mesh network that is opaque. In an opaque configuration, some or all balloons 602A to 602F can implement optical-electrical-optical (OEO) switching. For example, some or all balloons can include optical cross-connects (OXCs) for OEO conversion of optical signals. Other opaque configurations are also possible.

In a further aspect, balloons in an exemplary balloon network 600 can implement wavelength division multiplexing (WDM), which can help to increase link capacity. When WDM is implemented with transparent switching, physical lightpaths through the balloon network can be subject to the "wavelength continuity constraint." More specifically, because the switching in a transparent network is entirely optical, it can be necessary to assign the same wavelength for all optical links on a given lightpath.

An opaque configuration, on the other hand, can avoid the wavelength continuity constraint. In particular, balloons in an opaque balloon network can include the OEO switching systems operable for wavelength conversion. As a result, balloons can convert the wavelength of an optical signal at each hop along a lightpath.

Further, various routing algorithms can be employed in an opaque configuration. For example, to determine a primary lightpath and/or one or more diverse backup lightpaths for a given connection, exemplary balloons can apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) can be employed when determining a lightpath. Other techniques are also possible.

In some embodiments, balloon network 600 can implement station-keeping functions to help provide a desired network topology. For example, station-keeping can involve each balloon 602A to 602F maintaining and/or moving into a certain position relative to one or more other balloons in the network (and possibly in a certain position relative to the ground). As part of this process, each balloon 602A to 602F can implement station-keeping functions to determine its desired positioning within the desired topology, and if necessary, to determine how to move to the desired position.

The desired topology can vary depending upon the particular implementation. In some cases, balloons can implement station-keeping to provide a substantially uniform topology. In such cases, a given balloon 602A to 602F can implement station-keeping functions to position itself at substantially the same distance (or within a certain range of distances) from adjacent balloons in balloon network 600.

In other cases, balloon network 600 can have a non-uniform topology. For instance, exemplary embodiments can involve topologies where balloons are distributed more or less densely in certain areas, for various reasons. As an example, to help meet the higher bandwidth demands that are typical in urban areas, balloons can be clustered more densely over urban areas. For similar reasons, the distribution of balloons can be denser over land than over large bodies of water. Many other examples of non-uniform topologies are possible.

In a further aspect, the topology of an exemplary balloon network can be adaptable. In particular, station-keeping functionality of exemplary balloons can allow the balloons to adjust their respective positioning in accordance with a change in the desired topology of the network. For example, one or more balloons could move to new positions to increase or decrease the density of balloons in a given area. Other examples are possible.

In some embodiments, balloon network 600 can employ an energy function to determine if and/or how balloons should move to provide a desired topology. In particular, the state of a given balloon and the states of some or all nearby balloons can be input to an energy function. The energy function can apply the current states of the given balloon and the nearby balloons to a desired network state; e.g., a state corresponding to the desired topology. A vector indicating a desired movement of the given balloon can then be determined by determining the gradient of the energy function. The given balloon can then determine appropriate actions to take in order to effectuate the desired movement. For example, a balloon can determine an altitude adjustment or adjustments such that winds will move the balloon in the desired manner.

Figure 6B:
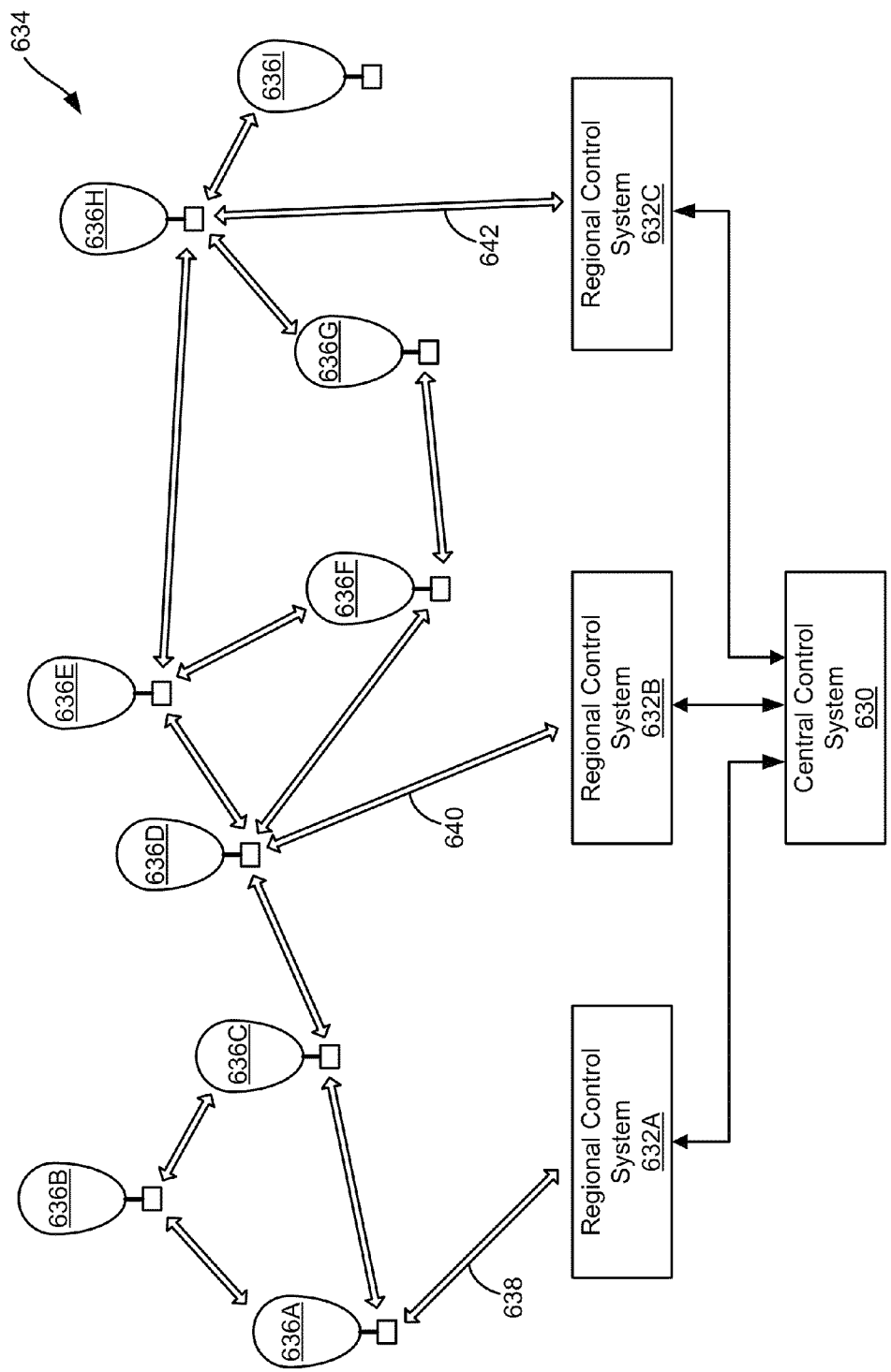
FIG. 6B shows another example network, in accordance with an example embodiment.

In some embodiments, mesh networking and/or station-keeping functions can be centralized. For example, FIG. 6B is a block diagram illustrating a balloon-network control system, according to an example embodiment. In particular, FIG. 2 shows a distributed control system, which includes central control system 630 and a number of regional control-systems 632A to 632C to coordinate certain functionality for balloon network 634. As such, the distributed control system can be configured to control and/or coordinate certain functions for balloons 636A to 636I. Each of balloons 636A to 636I can be configured with some or all of the components of balloons 200, 300, and/or 500 discussed above regarding FIGS. 2, 3, and 5.

In the illustrated embodiment, central control system 630 can be configured to communicate with balloons 636A to 636I via regional control systems 632A to 632C. Regional control systems 632A to 632C can be configured to receive communications and/or aggregate data from balloons in the respective geographic areas that they cover, and to relay the communications and/or data to central control system 630. Further, regional control systems 632A to 632C can be configured to route communications from central control system 630 to the balloons in their respective geographic areas. For instance, as shown in FIG. 6B, regional control system 632A can relay communications and/or data between balloons 636A to 636C and central control system 630, regional control system 632B can relay communications and/or data between balloons 636D to 636F and central control system 630, and regional control system 632C can relay communications and/or data between balloons 636G to 636I and central control system 630.

In order to facilitate communications between the central control system 630 and balloons 636A to 636I, certain balloons can be configured as downlink balloons, which are operable to communicate with regional control systems 632A to 632C. Accordingly, each regional control system 632A to 632C can be configured to communicate with the downlink balloon or balloons in the respective geographic area it covers. For example, in the illustrated embodiment shown in FIG. 6B, balloons 636A, 636D, and 636H are configured as downlink balloons. As such, regional control systems 632A to 632C can respectively communicate with balloons 636A, 636D, and 636H via optical links 638, 640, and 642, respectively.

In the illustrated configuration, only some of balloons 636A to 636I are configured as downlink balloons. The balloons 636A, 636F, and 636I configured as downlink balloons can relay communications from central control system 630 to other balloons in the balloon network, such as balloons 636B-E and 636G-H. However, it should be understood that it in some implementations, it is possible that all balloons can function as downlink balloons. Further, while FIG. 6B shows multiple balloons configured as downlink balloons, it is also possible for a balloon network to include only one downlink balloon, or possibly even no downlink balloons.

Note that a regional control system 632A to 632B can be a ground-based station configured to communicate with downlink balloons; e.g., ground-based station 612 of FIG. 6A. Thus, while not shown in FIG. 6B, a control system can be implemented in conjunction with other types of ground-based stations; e.g., access points, gateways, etc.

In a centralized control arrangement, such as that shown in FIG. 6B, central control system 630, and perhaps regional control systems 632A to 632C as well, can coordinate certain mesh-networking functions for balloon network 634. For example, balloons 636A to 636I can send central control system 630 state information, which the central control system 630 can utilize to determine a state of balloon network 634. The state information from a given balloon can include location data, communication-link information such as, but not limited to, the identity of other balloons with which the balloon has established an optical, RF, or other type of communication link, the bandwidth of the link, wavelength usage and/or availability on a link, etc., wind data collected by the balloon, and/or other types of information. Accordingly, central control system 630 can aggregate state information from some or all of balloons 636A to 636I in order to determine an overall state of balloon network 634.

The overall state of balloon network 634 can then be used to coordinate and/or facilitate certain mesh-networking functions such as determining lightpaths for connections. For example, the central control system 630 can determine a current topology based on the aggregate state information from some or all of balloons 636A to 636I. The topology can provide a picture of the current optical links that are available in balloon network and/or the wavelength availability on the links. This topology can then be sent to some or all of the balloons so that a routing technique can be employed to select appropriate lightpaths (and possibly backup lightpaths) for communications through balloon network 634.

In a further aspect, central control system 630 (and possibly regional control systems 632A to 632C as well) can also coordinate certain station-keeping functions for balloon network 634. For example, central control system 630 can provide state information received from balloons 636A to 636I to an energy function, which can effectively compare the current topology of the network to a desired topology, and provide a vector indicating a direction of movement (if any) for each balloon, such that the balloons can move towards the desired topology. Further, central control system 630 can use altitudinal wind data to determine respective altitude adjustments that can be initiated to achieve the movement towards the desired topology. Central control system 630 can provide and/or support other station-keeping functions as well.

FIG. 6B shows a distributed arrangement that provides centralized control, with regional control systems 632A to 632C coordinating communications between central control system 630 and balloon network 634. Such an arrangement can be useful to provide centralized control for a balloon network that covers a large geographic area. In some embodiments, a distributed arrangement can even support a global balloon network that provides coverage everywhere on earth. Of course, a distributed-control arrangement can be useful in other scenarios as well.

Further, it should be understood that other control-system arrangements are also possible. For instance, some implementations can involve a centralized control system with additional layers (e.g., sub-region systems within the regional control systems, and so on). Alternatively, control functions can be provided by a single, centralized, control system, which communicates directly with one or more downlink balloons.

In some embodiments, control and coordination of a balloon network can be shared by a ground-based control system and a balloon network to varying degrees, depending upon the implementation. In fact, in some embodiments, there can be no ground-based control systems. In such an embodiment, all network control and coordination functions can be implemented by the balloon network itself. For example, certain balloons can be configured to provide the same or similar functions as central control system 630 and/or regional control systems 632A to 632C. Other examples are also possible.

Furthermore, control and/or coordination of a balloon network can be de-centralized. For example, each balloon can relay state information to, and receive state information from, some or all nearby balloons. Further, each balloon can relay state information that it receives from a nearby balloon to some or all nearby balloons. When all balloons do so, each balloon can be able to individually determine the state of the network. Alternatively, certain balloons can be designated to aggregate state information for a given portion of the network. These balloons can then coordinate with one another to determine the overall state of the network.

Further, in some aspects, control of a balloon network can be partially or entirely localized, such that it is not dependent on the overall state of the network. For example, individual balloons can implement station-keeping functions that only consider nearby balloons. In particular, each balloon can implement an energy function that takes into account its own state and the states of nearby balloons. The energy function can be used to maintain and/or move to a desired position with respect to the nearby balloons, without necessarily considering the desired topology of the network as a whole. However, when each balloon implements such an energy function for station-keeping, the balloon network as a whole can maintain and/or move towards the desired topology.

As an example, each balloon A in a balloon network can receive distance information $d_1$ to $d_k$ with respect to each of its k closest neighbors. Each balloon A can treat the distance to each of the k balloons as a virtual spring with vector representing a force direction from the first nearest neighbor balloon i toward balloon A and with force magnitude proportional to $d_i$. The balloon A can sum each of the k vectors and the summed vector is the vector of desired movement for balloon A. Balloon A can attempt to achieve the desired movement by controlling its altitude.

Alternatively, this process could assign the force magnitude of each of these virtual forces equal to $d_i \times d_j$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

Figure 6C:
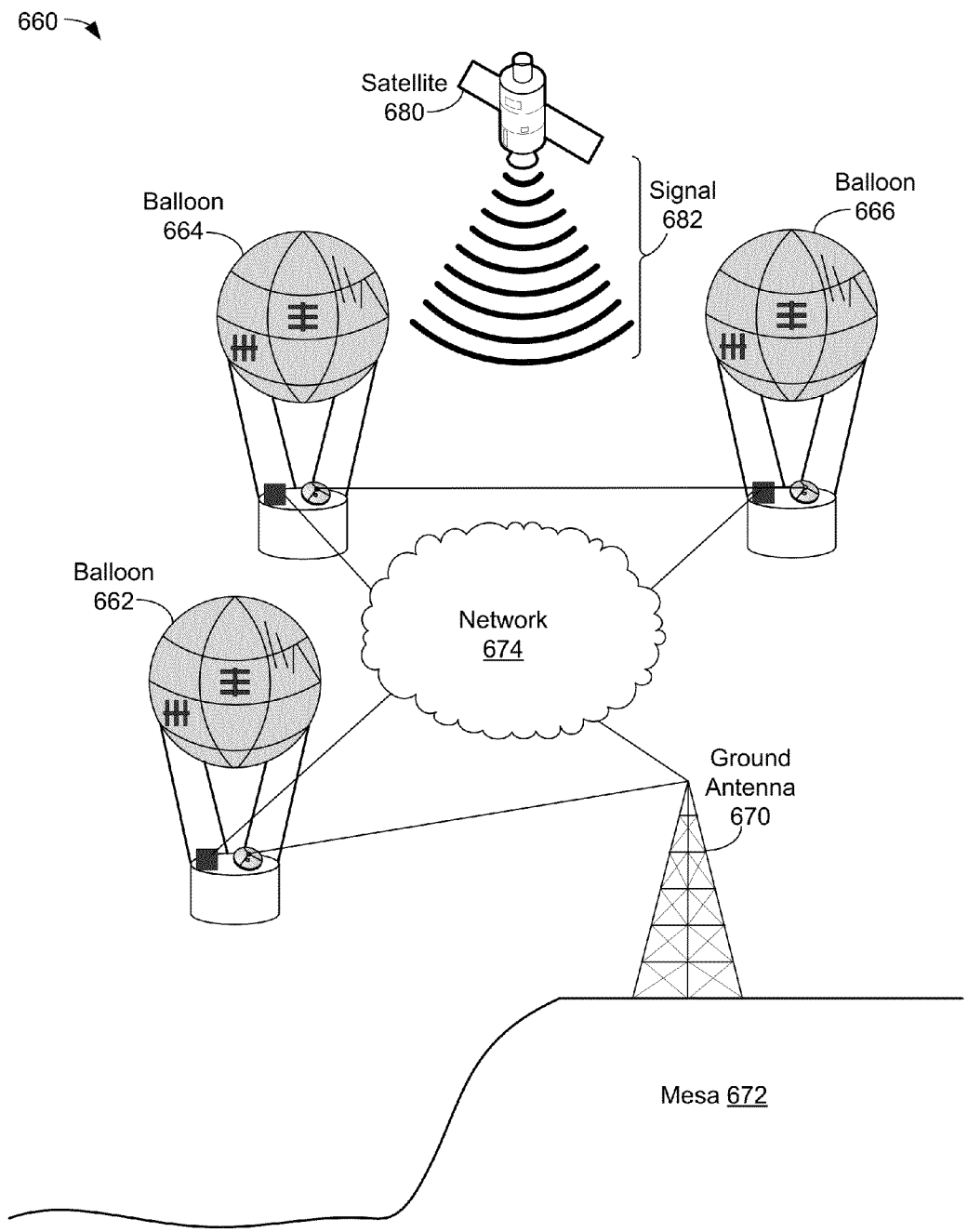
FIG. 6C shows an example network scenario, in accordance with an example embodiment.

FIG. 6C shows an example network scenario 660, in accordance with an example embodiment. Scenario 660 shows balloons 662, 664, and 666 aloft and connected with each other and with ground antenna 670 on mesa 672 via network 674. Balloons 662, 664, 666, ground antenna 670, network 674, and/or satellite 680 can include and/or be part of balloon network 600 shown in FIG. 6A and/or balloon network 634 shown in FIG. 6B. Each of balloons 662, 664, 666 can be configured with some or all of the components of balloons 200, 300, and/or 500 discussed above regarding FIGS. 2, 3, and 5.

As shown in FIG. 6C, envelopes of each of balloons 662, 664, and 666 are divided into both vertical and horizontal antenna sections, with each vertical antenna section depicted in FIG. 6C having a metallization pattern. During scenario 660, signals emitted by ground antenna 670 are received by one or more antenna sections of balloons 662, 664, and 666.

Scenario 660 includes some entities with direct connections that bypass network 674; e.g., balloons 664 and 666, and balloon 662 and ground antenna 670. In some other scenarios not shown in FIG. 6C, all connections between entities utilize network 674.

Scenario 660 continues with satellite 680 emitting signal 682 received by one or more antenna sections of each of balloons 664 and 666. Initially during scenario 660, signal 682 is not received by balloon 662. Upon detecting a lack of communication with satellite 680, balloon 662 can request balloons 664, 666 and/or ground antenna 670 to route part or all of signal 682 from satellite 680 to balloon 662. During scenario 660, balloon 664 agrees to route the requested portion or the entirety of signal 682 to balloon 662 via network 674.

Later, balloon 662 regains connectivity with satellite 680. In that event, balloon 662 can request balloon 664 stop sending signal 682 via network 674 both to preserve bandwidth on network 674 and as the copy of signal 682 sent from balloon 664 is now redundant to balloon 662.

Computing Device Architecture

Figure 7A:
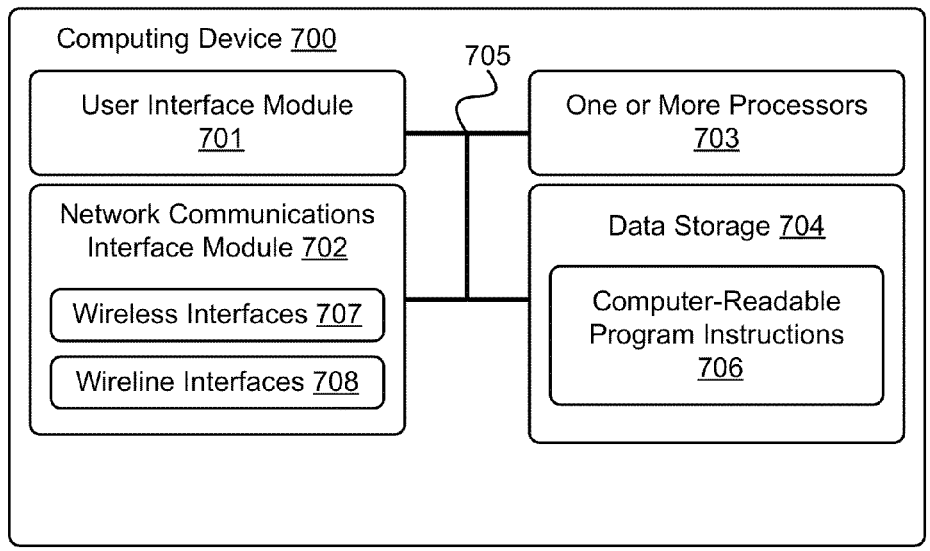
FIG. 7A is a block diagram of a computing device, in accordance with an example embodiment.

FIG. 7A is a block diagram of computing device 700, in accordance with an example embodiment. In particular, computing device 700 shown in FIG. 7A can be configured at least to perform one or more functions of method 100, computing device 214, communication systems 216, 218, positioning system 224, ground-based stations 606, 612, and/or control systems 314, 514, 630, 632A, 632B, and 632C. Computing device 700 can include a user interface module 701, a network-communication interface module 702, one or more processors 703, and data storage 704, all of which can be linked together via a system bus, network, or other connection mechanism 705.

User interface module 701 can be operable to send data to and/or receive data from external user input/output devices. For example, user interface module 701 can be configured to send and/or receive data to and/or from user input devices such as a keyboard, a keypad, a touch screen, a computer mouse, a track ball, a joystick, a camera, a voice recognition module, and/or other similar devices. User interface module 701 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 701 can also be configured to generate audible output(s), such as a speaker, speaker jack, audio output port, audio output device, earphones, and/or other similar devices.

Network-communications interface module 702 can include one or more wireless interfaces 707 and/or one or more wireline interfaces 708 that are configurable to communicate via a network, such as networks 600, 630, and 674 respectively shown in FIGS. 6A, 6B, and 6B. Wireless interfaces 707 can include one or more wireless transmitters, receivers, and/or transceivers, such as a Bluetooth transceiver, a Zigbee transceiver, a Wi-Fi transceiver, a WiMAX transceiver, transceiver(s) for various cellular protocols such as GSM, CDMA, UMTS, EV-DO, WiMAX, and/or LTE, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 703 can include one or more general purpose processors and/or one or more special purpose processors (e.g., digital signal processors, application specific integrated circuits, etc.). Processors 703 can be configured to execute computer-readable program instructions 706 that are contained in the data storage 704 and/or other instructions as described herein.

Data storage 704 can include one or more computer-readable storage media that can be read and/or accessed by at least one of processors 703. The one or more computer-readable storage media can include volatile and/or non-volatile storage components, such as optical, magnetic, organic or other memory or disc storage, which can be integrated in whole or in part with at least one of processors 703. In some embodiments, data storage 704 can be implemented using a single physical device (e.g., one optical, magnetic, organic or other memory or disc storage unit), while in other embodiments, data storage 704 can be implemented using two or more physical devices.

Data storage 704 can include computer-readable program instructions 706, and perhaps additional data. In some embodiments, data storage 704 can additionally include storage required to perform at least part of the herein-described methods and techniques and/or at least part of the computer-based functionality of the herein-described devices and networks.

Cloud-Based Servers

Figure 7B:
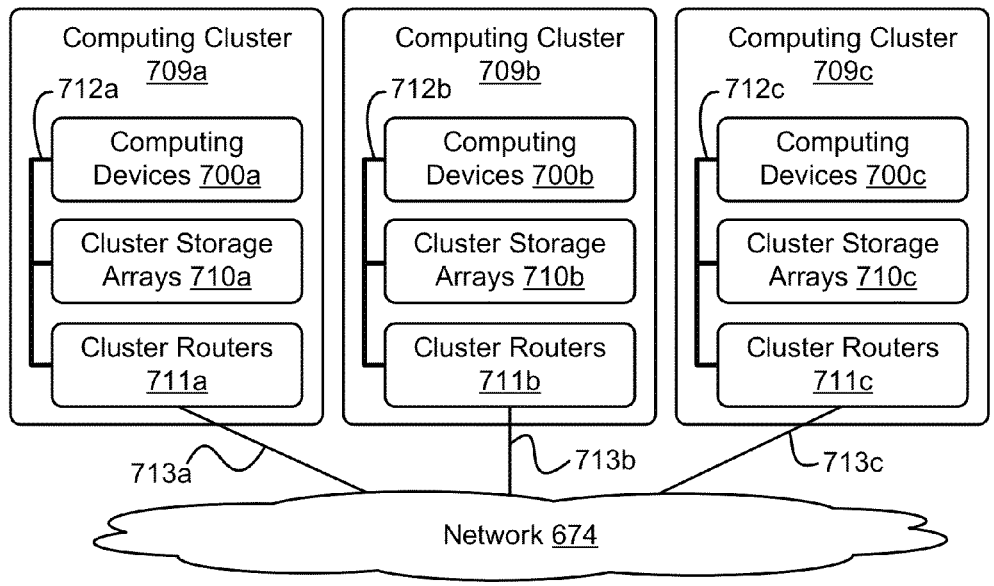
FIG. 7B depicts a network of computing clusters arranged as a cloud-based server system, in accordance with an example embodiment.

FIG. 7B depicts a network 674 of computing clusters 709a, 709b, 709c arranged as a cloud-based server system, in accordance with an example embodiment. Computing device 212 and control systems 314, 514 can be cloud-based devices that store program logic and/or data of cloud-based applications and/or services. In some embodiments, computing device 212, control system 314, 514, 630, 632A, 632B, or 632C can be a single computing device residing within a single payload or computing center. In other embodiments, computing device 212, control systems 314, 514, 630, 632A, 632B and/or control system 632C can include multiple computing devices in a single payload or computing center, or even multiple computing devices located diverse geographic locations.

In some embodiments, data and services at computing device 212, control systems 314, 514, 630, 632A, 632B and/or control system 632C can be encoded as computer readable information stored in non-transitory, tangible computer readable media (or computer readable storage media) and accessible by other computing devices. In some embodiments, data at computing device 212, control systems 314, 514, 630, 632A, 632B and/or control system 632C can be stored on a single disk drive or other tangible storage media, or can be implemented on multiple disk drives or other tangible storage media located at one or more diverse geographic locations.

FIG. 7B depicts a cloud-based server system in accordance with an example embodiment. In FIG. 7B, the functions of computing device 212, control systems 314, 514, 630, 632A, 632B and/or control system 632C can be distributed among three computing clusters 709a, 709b, and 709c. Computing cluster 709a can include one or more computing devices 700a, cluster storage arrays 710a, and cluster routers 711a connected by a local cluster network 712a. Similarly, computing cluster 709b can include one or more computing devices 700b, cluster storage arrays 710b, and cluster routers 711b connected by a local cluster network 712b. Likewise, computing cluster 709c can include one or more computing devices 700c, cluster storage arrays 710c, and cluster routers 711c connected by a local cluster network 712c.

In some embodiments, each of the computing clusters 709a, 709b, and 709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709a, for example, computing devices 700a can be configured to perform various computing tasks of computing device 212, control systems 314, 514, 630, 632A, 632B and/or control system 632C. In one embodiment, the various functionalities of computing device 212, control systems 314, 514, 630, 632A, 632B and/or control system 632C can be distributed among one or more of computing devices 700a, 700b, and 700c. Computing devices 700b and 700c in computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with computing device 212, control systems 314, 514, 630, 632A, 632B and/or control system 632C can be distributed across computing devices 700a, 700b, and 700c based at least in part on the processing requirements of computing device 212, control systems 314, 514, 630, 632A, 632B and/or control system 632C, the processing capabilities of computing devices 700a, 700b, and 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 710a, 710b, and 710c of the computing clusters 709a, 709b, and 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of computing device 212, control systems 314, 514, 630, 632A, 632B and/or control system 632C can be distributed across computing devices 700a, 700b, and 700c of computing clusters 709a, 709b, and 709c, various active portions and/or backup portions of these components can be distributed across cluster storage arrays 710a, 710b, and 710c. For example, some cluster storage arrays can be configured to store the data of control system 630, while other cluster storage arrays can store data of control system 632A, 632B, and/or 632C. Additionally, some cluster storage arrays can be configured to store backup versions of data stored in other cluster storage arrays.

The cluster routers 711a, 711b, and 711c in computing clusters 709a, 709b, and 709c can include networking equipment configured to provide internal and external communications for the computing clusters. For example, the cluster routers 711a in computing cluster 709a can include one or more internet switching and routing devices configured to provide (i) local area network communications between the computing devices 700a and the cluster storage arrays 701a via the local cluster network 712a, and (ii) wide area network communications between the computing cluster 709a and the computing clusters 709b and 709c via the wide area network connection 713a to network 674. Cluster routers 711b and 711c can include network equipment similar to the cluster routers 711a, and cluster routers 711b and 711c can perform similar networking functions for computing clusters 709b and 709b that cluster routers 711a perform for computing cluster 709a.

In some embodiments, the configuration of the cluster routers 711a, 711b, and 711c can be based at least in part on the data communication requirements of the computing devices and cluster storage arrays, the data communications capabilities of the network equipment in the cluster routers 711a, 711b, and 711c, the latency and throughput of local networks 712a, 712b, 712c, the latency, throughput, and cost of wide area network links 713a, 713b, and 713c, and/or other factors that can contribute to the cost, speed, fault-tolerance, resiliency, efficiency and/or other design goals of the moderation system architecture.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A balloon, comprising:
   a payload; and
   an envelope, comprising a plurality of antenna sections disposed symmetrically about a longitudinal axis of the balloon;
   wherein a first antenna section of the plurality of antenna sections is different from a second antenna section of the plurality of antenna sections, the first antenna section is configured to receive a first type of signal, the second antenna section is configured to receive a second type of signal different from the first type of signal, and both the first antenna section and the second antenna section are configured at least to receive signals and to convey the received signals to the payload;
   wherein the first antenna section comprises a first metallization pattern to receive the first type of signal; and
   wherein the second antenna section comprises a second metallization pattern to receive the second type of signal, the first metallization pattern being different from the second metallization pattern.

2. The balloon of claim 1, wherein the first antenna section comprises a metallized section.

3. The balloon of claim 1, wherein the first metallization pattern comprises a symmetric metallization pattern.

4. The balloon of claim 1, wherein the first metallization pattern comprises an asymmetric metallization pattern.

5. The balloon of claim 1, wherein the first metallization pattern comprises a patch metallization pattern.

6. The balloon of claim 5, wherein the patch metallization pattern comprises a patch array.

7. The balloon of claim 1, wherein the first metallization pattern comprises a horizontal metallization pattern.

8. The balloon of claim 1, wherein the first metallization pattern comprises a vertical metallization pattern.

9. The balloon of claim 1, wherein the first metallization pattern comprises a two-dimensional (2D) metallization pattern.

10. The balloon of claim 1, wherein the first metallization pattern comprises a Z metallization pattern.

11. The balloon of claim 1, wherein the first antenna section and the second antenna section are separated by a seam, and wherein the seam comprises an insulating material.

12. The balloon of claim 1, wherein the payload further comprises:
    a control system, configured to receive signals and switch between the antenna sections such that when the control system is switched to a receiving antenna section, the received signals are received at the control system from the receiving antenna section.

13. The balloon of claim 12, wherein the control system is further configured to transmit transmittable signals, and wherein when the control system is switched to a transmitting antenna section, the control system is configured to provide the transmittable signals to the transmitting antenna section for transmission.

14. The balloon of claim 1, wherein at least one section of the plurality of sections is not an antenna section.

15. A method, comprising:
    receiving a first signal of a first type at a balloon, wherein the balloon comprises a first receiver, a second receiver, a payload, and an envelope, wherein the envelope comprises a plurality of antenna sections disposed symmetrically about a longitudinal axis of the balloon, wherein a first antenna section of the plurality of antenna sections is different from a second antenna section of the plurality of antenna sections, wherein the first signal is received at the first antenna section, and wherein the first antenna section comprises a first metallization pattern configured to receive and convey the first signal to the first receiver; and
    receiving a second signal of a second type different from the first type at the balloon, wherein the second signal is received at the second antenna section, and wherein the second antenna section comprises a second metallization pattern configured to receive and convey the second signal to the second receiver, the first metallization pattern being different from the second metallization pattern.

16. The method of claim 15, wherein the balloon is initially operating in a first mode in which the balloon operates the first receiver to receive the first signal and does not operate the second receiver, the method further comprising:
    while the balloon is operating in the first mode, detecting a trigger event; and
    in response to detecting the trigger event, the balloon switching from operation in the first mode to operation in a second mode in which the balloon operates the second receiver to receive the second signal and does not operate the first receiver.

17. The method of claim 15, further comprising:
in response to receiving the first signal, determining a transmittable signal; and
transmitting the transmittable signal from the balloon using a transmitting antenna section, wherein the transmitting antenna section comprises either the first antenna section or the second antenna section.

18. The method of claim 17, wherein determining the transmittable signal comprises:
determining diagnostic information about the balloon; and
generating the transmittable signal based on the diagnostic information.

19. The method of claim 17, wherein the transmittable signal is based on the first signal.

20. The method of claim 17, wherein the balloon further comprises a control system, and wherein transmitting the transmittable signal comprises:
selecting the transmitting antenna section using the control system; and
transmitting the transmittable signals using the transmitting antenna section.

* * * * *